(12) United States Patent
Gall et al.

(10) Patent No.: US 8,535,191 B1
(45) Date of Patent: Sep. 17, 2013

(54) ALUMINUM FLANGE WITH ANTI-ROTATION SLOTS

(75) Inventors: David E. Gall, Clarkston, MI (US); Kevin J. Kaplan, Macomb, MI (US); Eric James LaMothe, Goodrich, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 13/551,224

(22) Filed: Jul. 17, 2012

(51) Int. Cl.
*F16H 1/32* (2006.01)

(52) U.S. Cl.
USPC .............................. 475/160; 475/331; 74/650

(58) Field of Classification Search
USPC ............ 475/159, 160, 220, 230, 235; 74/650
See application file for complete search history.

(56) References Cited

U.S. PATENT DOCUMENTS

| 4,719,817 | A | * | 1/1988 | Azuma | 475/235 |
| 4,959,043 | A | * | 9/1990 | Klotz et al. | 475/230 |
| 7,722,495 | B1 | * | 5/2010 | Stanley | 475/220 |
| 8,187,136 | B2 | * | 5/2012 | Fujita et al. | 475/230 |
| 8,382,632 | B2 | * | 2/2013 | Segawa et al. | 475/230 |
| 2003/0040390 | A1 | * | 2/2003 | Forrest et al. | 475/150 |

* cited by examiner

*Primary Examiner* — Justin Holmes
(74) *Attorney, Agent, or Firm* — Jennifer M. Brumbaugh; Mack Haynes; Rader, Fishman + Grauer, PLLC

(57) ABSTRACT

A differential flange assembly is disclosed herein that includes a flange member and a washer member. The flange member is defined by an engagement face and having an aperture therethrough. At least one slot is formed on the engagement face so as to extend radially outward from the aperture. The washer member has at least one tab extending from a peripheral edge of the washer member and at least one opening. The tab is configured to be seated within the slot to mate the washer member to the engagement face of the flange member. The interaction of the slot of the flange member and the tab of the washer member prevent rotation of the washer member with respect to the flange member.

14 Claims, 4 Drawing Sheets

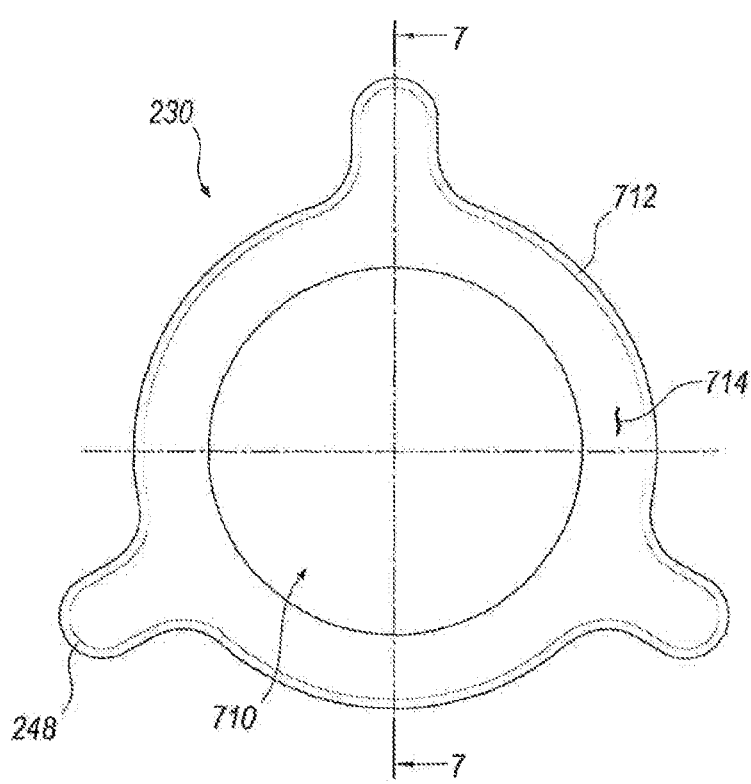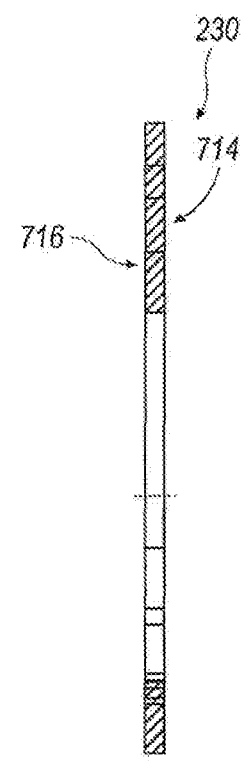
FIG. 6
FIG. 7

ALUMINUM FLANGE WITH ANTI-ROTATION SLOTS

BACKGROUND

Differential assemblies are typically configured to transmit an input drive torque from a pinion gear to an axle output shaft through a ring gear, associated bevel pinion gears and a differential housing, which are mounted within a driveline assembly, such as an axle or transmission housing. The bevel pinion gears mesh with corresponding output bevel gears attached to left and right output shafts that extend one on each side of the ring gear. The differential assembly compensates for speed differences between left and right wheels connected to the left and right output shafts. Differential assemblies are typically of three types, a locking, limited slip and an open type. The differential housing may be one or two pieces and are generally constructed of cast iron. Indeed, cast iron differential housings are commonly used due to its low cost of manufacture and high strength. However, cast iron differential housings adversely impact vehicle weight by contributing significantly to the weight of a vehicle's rotating inertia. While the use of lower weight materials such as aluminum would significantly reduce the differential weight, issues surrounding the use of such lightweight materials have other concerns. For example, issues surrounding the use of aluminum housings may include decreased wear resistance at a contact area with a side gear shim, strength and deflection issues over the full operating temperature range, as well as increased transmission of noise and vibration.

Manufacturers are constantly attempting to reduce vehicle weight to improve fuel and driveline efficiency, which is a continued topic with regulators and a driving force of component design in the automotive industry. Housing size and weight are generally determined by the vehicle engine size, operating conditions, strength of the housing and clearances needed for the rotating assembly configured within the housing. Thus, it is desirable to find individual components that may be constructed of resilient materials and designs to minimize weight while maintaining or improving strength and resiliency of the components. Therefore, there is a need in drivetrain design to provide a differential that benefits from the weight savings of partial or all-aluminum housings, while maintaining the strength and economy of the all cast iron housing.

BRIEF SUMMARY

A differential flange assembly is disclosed herein that includes a flange member and a washer member. The flange member is defined by an engagement face and having an aperture therethrough. At least one slot is formed on the engagement face so as to extend radially outward from the aperture. The washer member has at least one tab extending from a peripheral edge of the washer member and at least one opening. The tab is configured to be seated within the slot to mate the washer member to the engagement face of the flange member. The interaction of the slot of the flange member and the tab of the washer member prevent rotation of the washer member with respect to the flange member.

The differential flange assembly may be used as part of a differential assembly that includes the differential flange and a differential carrier. In one exemplary arrangement, the differential housing may include cast iron differential carrier and that cooperates with light weight material flange to contain the components of the differential assembly. In one particular exemplary arrangement, the flange may be constructed of aluminum for reduced weight. The tabbed washer may also provide at least one of a sliding surface and a reaction surface during high loading and high speed deltas, thereby serving to protect the aluminum flange.

The flange may be configured with at least one oil channel beneath a washer. At least one oil channel is configured to provide lubrication paths for both the gear and washer surfaces of the differential assembly. A circumferential oil groove may also be formed in the flange to direct the oil behind a side gear.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 6 illustrates a plan view of an exemplary tabbed washer; and

FIG. 7 illustrates a cross-sectional view of the exemplary tabbed washer of FIG. 6.

DETAILED DESCRIPTION

The present disclosure relates to a two-piece torque transmitting differential assembly. The two pieces include a flange constructed of a first material and a differential carrier constructed of a second material that is different than the first material. The materials may be aluminum, steel, grey iron, ductile cast iron, nodular cast iron, spheroidal graphite iron, spherulitic graphite cast iron or other known material.

Figure 1:
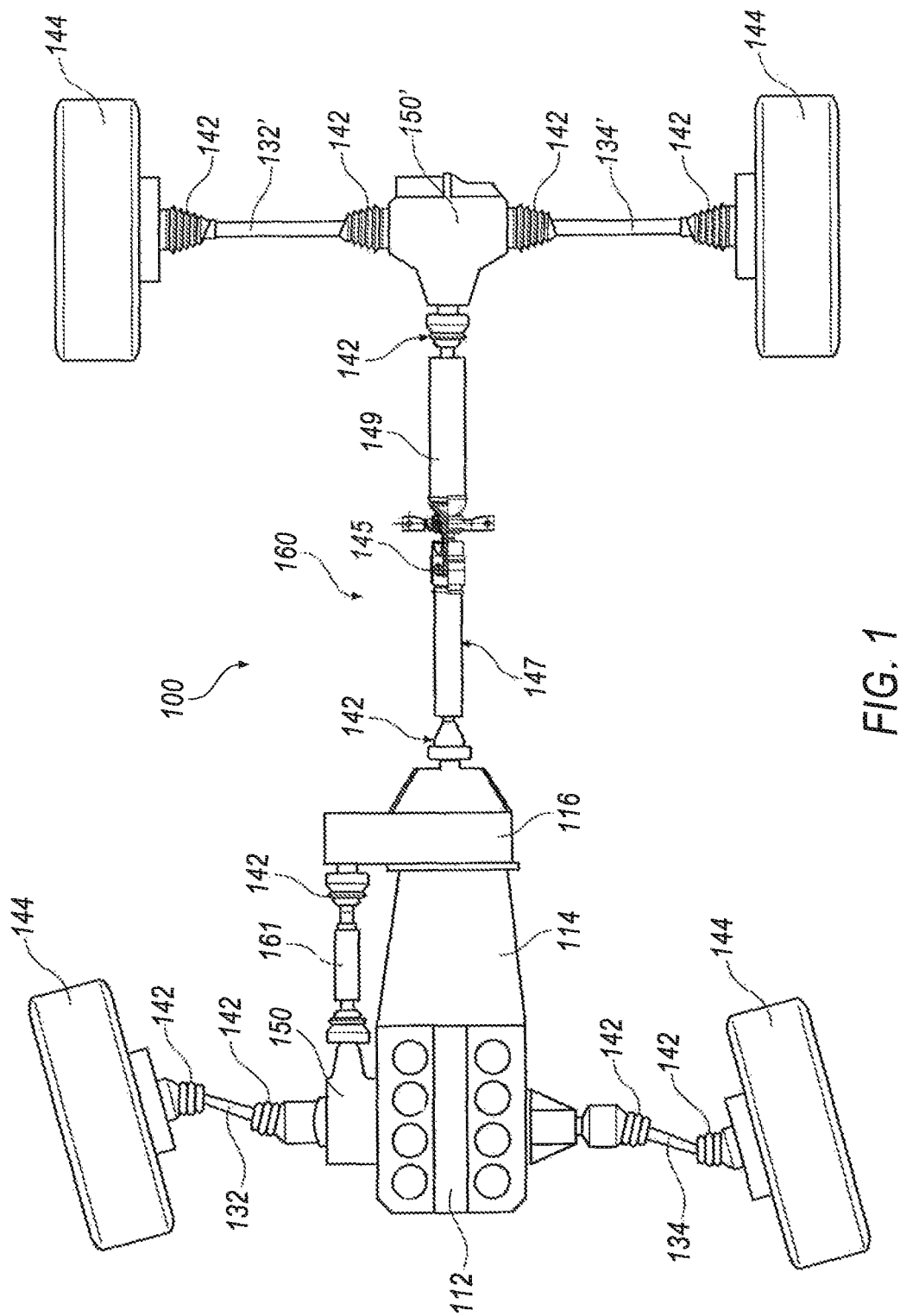
FIG. 1 illustrates a top view of an exemplary driveline system that includes an exemplary differential assembly.

FIG. 1 illustrates an exemplary driveline assembly 100 of a vehicle. The driveline assembly 100 includes an engine 112 that is connected to a transmission 114 and a power take off unit 116. It should be realized that the differential unit 150 may also be used without power transfer unit to provide a front wheel drive gear ratio, thus the disclosure is not limited to the arrangement illustrated in FIG. 1. Generally, the engine 112 may be affixed to the transmission 114 through an engine crankshaft (not shown) that is fixed to a transmission input shaft to provide torque to the transmission 114. The torque may be transmitted through a series of gears (not shown), within a transmission housing, and ultimately to a transmission output shaft (not shown). A front differential 150 may be rotatively connected to the transmission output shaft through a ring gear.

Front differential 150 has a plurality of shaft elements 132, 134 and corresponding articulating torque transfer joints 142. For example, front differential assembly 150 includes right hand front half shaft 132 and a left hand front half shaft 134, each of which are connected to a wheel 144 and are configured to deliver power to those wheels 144. While the joints 142 are illustrated as constant velocity joints 142, it is understood that other types of joints may be used, such as, but not limited to universal, tripod, cardan, double cardan and plunging constant velocity joints.

For the exemplary arrangement of FIG. 1, the power take off unit 116 has a propeller shaft 160 and a front wheel propeller shaft 161 extending therefrom. The front wheel propeller shaft 161 connects the front differential 150 to the power take off unit 116. The propeller shaft 160 connects the power take off unit 116 to a rear differential 150', wherein the rear differential 150' includes a rear right hand side shaft 132' and a rear left hand side shaft 134', each of which ends with a wheel 144 on one end thereof.

The propeller shaft 160 may include an articulated tripod joint 145, a front propshaft 147, a rear propshaft 149, and two high speed constant velocity joints 142. The constant velocity joints transmit power to the wheels 144 through the driveshaft 160 even if the wheels or the shaft have changing angles due to steering and suspension jounce and rebound. A constant velocity joint 142 is located on both ends of the half shafts that connect to the wheel 144 and the rear differential 150'.

As discussed above, the driveline 100 represents an all wheel drive vehicle, however it should be noted that the embodiments of the differential assemblies 150, 150' of the current disclosure can also be used in rear wheel drive vehicles, front wheel drive vehicles, all wheel drive vehicles and four wheel drive vehicles.

Figure 2:
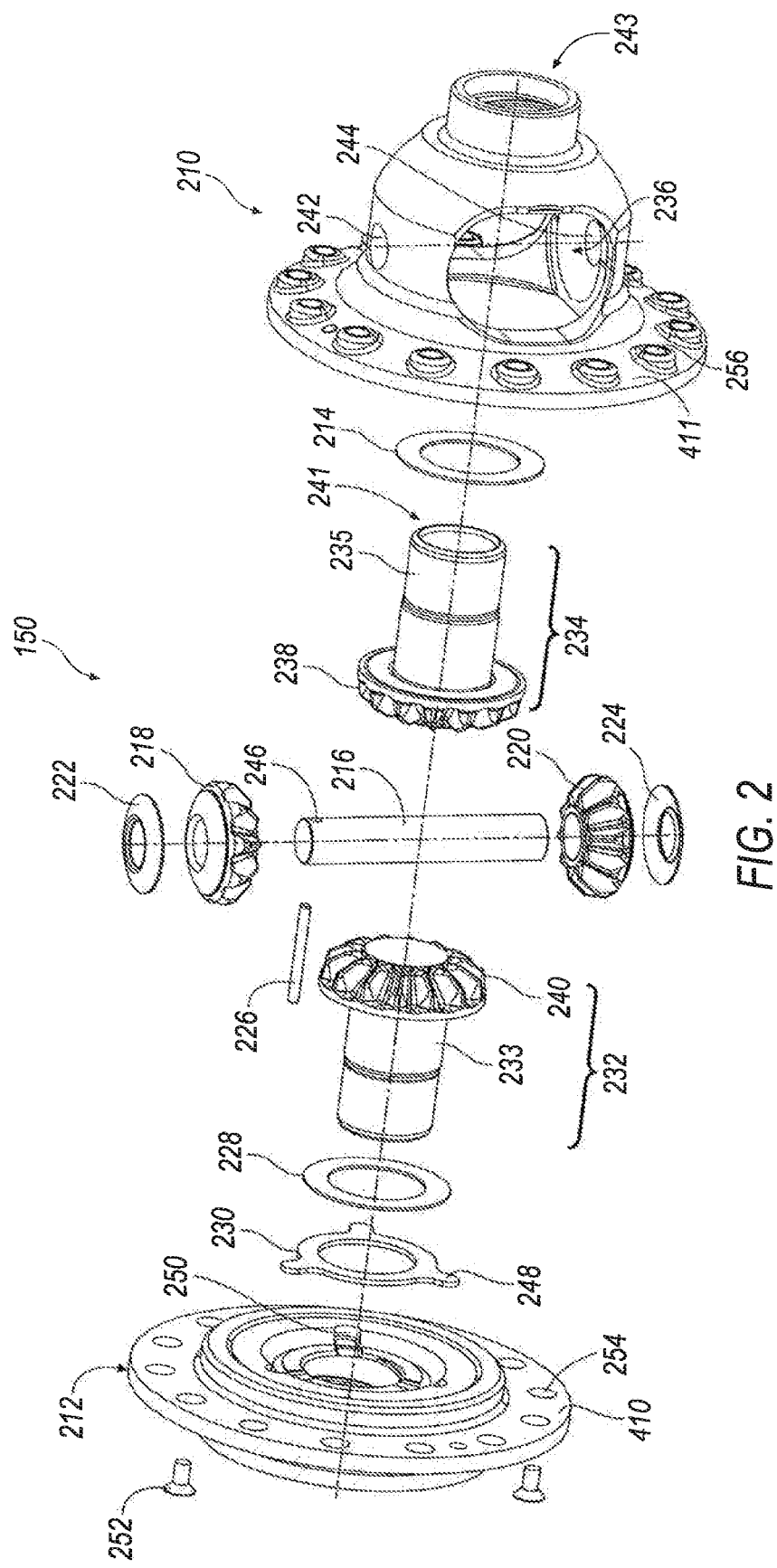
FIG. 2 illustrates an exploded view of an exemplary differential assembly illustrated in FIG. 1.

Referring now to FIG. 2, elements of an exemplary differential assembly 150, will now be described in detail. Differential assembly 150 includes a differential carrier 210, and a differential flange 212 that cooperate configured to secure a series of gears and components within the differential carrier 210, as will be explained in further detail below. For example, differential assembly 150 further includes left hand side gear hub 232, a right hand side gear hub 234, thrust washers 214, 228, at least one pinion shaft 216, a plurality of pinion gears 218, 220 and pinion washers 222, 224, and a tabbed washer 230.

Thrust washer 214 is mounted over a shaft portion 235 of right hand side gear hub 234, opposing a side gear 238 secured to an end of shaft portion 235. Assembled thrust washer 214 and right hand side gear hub 234 are positioned within a cavity 236 of the differential carrier 210 such that an end 241 of right hand side gear hub 234 extends through an opening 243 of differential carrier 210, as illustrated in FIG. 3.

Figure 3:
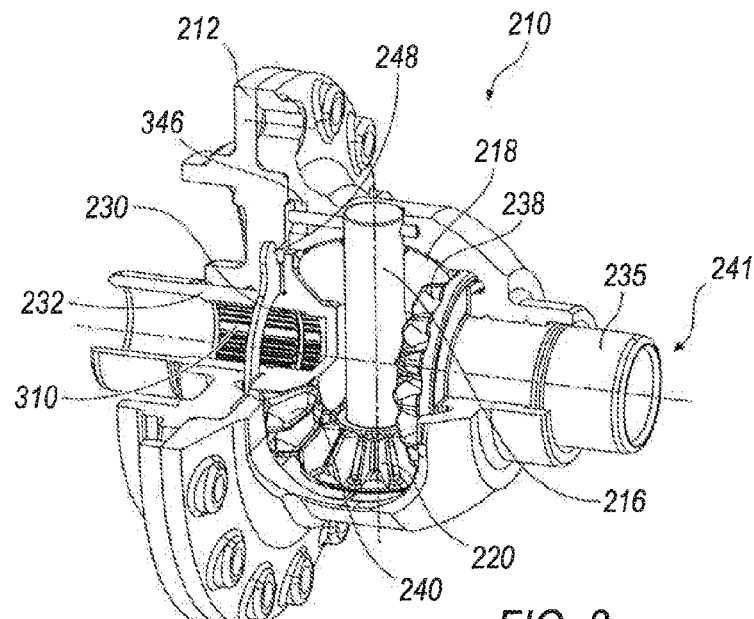
FIG. 3 illustrates a partial cut-out view of the exemplary differential assembly of FIG. 2 assembled.

In the embodiment shown in FIGS. 2-3, pinion shaft 216 is configured as a two pinion gear arrangement, however it is understood that other pinion gear arrangements are contemplated, including a four pinion gear arrangement. Pinion shaft 216 has a first pinion gear 218 secured on one end, a second pinion gear 220 secured on an opposite end, and pinion thrust washers 222, 224 positioned radially outward of the pinion gears 218, 220. The pinion shaft 216, the gears 218, 220 and pinion washers 222, 224 are also positioned within the cavity 236 such that the pinion gears 218 (omitted from FIG. 3 merely for illustrative purposes), 220 are engaged with side gear 238 of right hand side gear hub 234. During assembly, the first or second pinion gears 218, 220 may be positioned within the cavity 236 and the pinion shaft 216 may be slid through a corresponding aperture 242 (best seen in FIG. 2) and connected to the opposing gears 218, 220 and thrust washers 222, 224 such that the pinion shaft 216, the pinion thrust washers 222, 224 and the pinion gears 218, 220 are rotatively fixed to the differential carrier 210. Additionally, to prevent the pinion shaft 216 from sliding out of the differential carrier 210, a lock pin 226 may be provided that is configured to engage with a pinion shaft aperture 246 in the pinion shaft 216 and a lock pin cavity 346 (see FIG. 3) configured in the differential carrier 210.

Thrust washer 228 is mounted over a shaft portion 233 of left hand side gear hub 232, opposing a side gear 240 secured to end of shaft portion 233. Tabbed washer 230 is also mounted over the shaft portion 233 of left hand side gear hub 232. Left hand side gear hub 232 is positioned within cavity 236 such that side gear operatively engages with pinion gears 218, 220. Shaft portion 233 extends outwardly from cavity 236 of differential carrier 210. As discussed above, the flange 212 is configured to cooperate with the differential carrier 210 to retain the internal components of the differential assembly 150 therewithin.

In the exemplary arrangement, the flange 212 is made of a light-weight material, such as aluminum, to reduce the weight of the differential assembly 150. In one exemplary arrangement, the flange 212 is constructed of aluminum. More specifically, the flange 212 may be constructed of an aluminum alloy, such as, but not limited to a 6013 alloy with a T6 heat treatment. The alloy may be an aluminum-magnesium-silicon-copper alloy typically used in the aircraft industry. The use of a light weight material, such as aluminum, for the flange 212 serves to provide a differential assembly 150 with a significantly reduced weight. The 6013 alloy with T6 heat treatment may also be utilized due to its relatively stable strength under vehicle engine operating temperatures. Other suitable light-weight materials, including, but not limited to, titanium and magnesium, may also be used.

Figure 4:
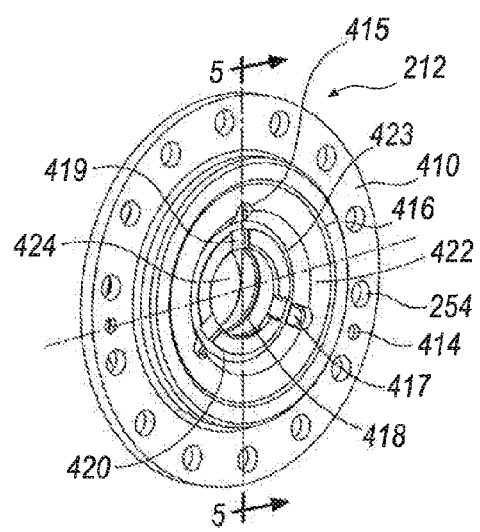
FIG. 4 illustrates an isometric front view of an exemplary flange from the differential assembly of FIG. 2.
Figure 5:
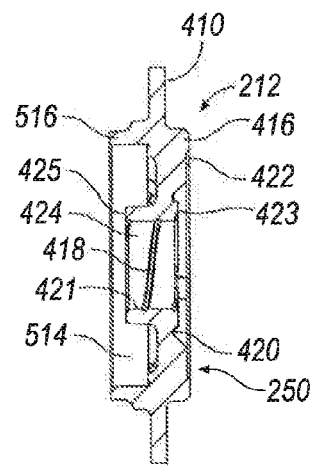
FIG. 5 illustrates a cross-sectional view of the exemplary flange of FIG. 4.

Details of the flange 212 are best seen in FIGS. 4-5. More specifically, the flange 212 is defined by an outer periphery mating surface 410 that may be configured with a plurality of apertures 254 each configured to receive fasteners (not shown), such as, for example, a bolt. Mating surface 410 is configured to mate with a corresponding outer periphery mating surface 411 of differential carrier 210. Mating surface 411 also includes a plurality of apertures 256 that are configured to align with apertures 254. In one exemplary arrangement, apertures 256 are threaded to facilitate connection of the flange 212 to differential carrier 210. To facilitate proper alignment of flange 212 and differential carrier 210, outer periphery mating surface 410 may be provided with at least one alignment feature 414 that is configured to cooperate with a corresponding alignment feature disposed on the differential carrier 210. In the exemplary configuration illustrated in FIGS. 3-5, the alignment feature 414 is configured as an aperture that receives an alignment fastener 252. Alignment fastener 252 is configured to be received through alignment element 414 and engage a corresponding alignment aperture (not shown) formed on outer periphery mating surface 411 of differential carrier 210.

Flange 212 is further defined by a center aperture or shaft support 424 configured to receive the shaft portion 233 of the left hand gear hub 232 therethrough (best seen in FIG. 3). Extending around center aperture 424 is a raised pilot ring 416. Pilot ring 416 is configured to be inserted into a corresponding recess (best seen in FIG. 3) of the differential carrier 210, so as to facilitate alignment of flange 212 with differential carrier 210.

Flange 212 further includes at least one slot 417 that extends radially outward from central aperture 424. Slots 417 are sized to receive tabs 248 of the tabbed washer 230, as will be explained below in further detail. In the exemplary arrangement illustrated in FIGS. 3-5, there are three slots 417 provided that are spaced equally apart. Each slot 417 includes an end portion 415 and an inner portion 419. End potion of the slot 417 is positioned within an outer land area 422 that is positioned between pilot ring 416 and an inner land area 423. Inner portion 419 of slot 417 is formed in inner land area 423 and opens into central aperture 424. A circumferential oil channel 420 is formed between the outer and inner land areas 422, 423 so as to divide slot 417 into end portion 415 and inner portion 419.

Flange 212 may further include at least one oil groove 418 that is fluidly connected to slot 417 and oil channel 420. In one exemplary arrangement, oil groove 418 extends from oil channel 420 via inner portion 419 of slot 417 along an inside surface of 421 of central aperture 424. In one exemplary configuration, oil groove 418 is configured as spiral-shaped and extends the length of the central aperture 424 to a rearward edge 425 thereof, as best seen in FIG. 5. However, other shaped oil grooves 418 are also contemplated. In the exemplary arrangement illustrate herein, at least one oil groove 418 extends from each slot 417 such that there are an equal number of oil grooves 418 and slots 417. The function of the oil groove 418 and oil channel 420 will be described in further detail below.

Referring to FIGS. 6-7, the structure of the exemplary tabbed washer 230 will now be described in detail. As discussed above, the tabbed washer 230 includes at least one tab 248 that extends radially outward from an outer periphery 712 of the tabbed washer 230. In the exemplary arrangement illustrated herein, the tabbed washer 230 includes three tabs 248 equally spaced apart and configured to mate with the slots 417. However, it is understood that the number of tabs 248 may vary and is predetermined based on the number of slots 417 configured in the flange 212. The tabbed washer 230 is also configured with a through aperture 710 to enable tabbed washer 230 to be disposed over the shaft portion of left hand side gear hub 232. As best seen in FIG. 7, the tabbed washer 230 is further defined by a generally planar top surface 714 and a generally planar bottom surface 716. At least one of the planar surfaces 714, 716 may be configured as at least one of a sliding surface and a reaction surface during high loading and high speed operation of the differential assembly 150 to protect the flange 212 from excessive wear due to rubbing between at least one of the washer 228, the tabbed washer 230 and the flange 212. In some exemplary arrangements, one or both of the planar surfaces 714, 716 of tabbed washer 230 may be treated and/or coated for improved wear resistance at the washer surface. Further, in some exemplary arrangements, the thickness of tabbed washer 230 may be designed to be sufficiently wide enough such that thrust washer 228 may be eliminated from the differential assembly 150.

Tabbed washer 230 is assembled to flange 212 such that tabs 248 are positioned within slots 417. In one exemplary arrangement, slots 417 and tabs 248 are configured such that tabbed washer 230 are press-fit within slots 417. In another exemplary arrangement, slots 417 are sized to be slightly larger than tabs 248, thereby enabling tolerances to be relaxed. Once tabbed washer 230 is positioned within slots 417, tabbed washer 230 is supported on inner land area 423 such that oil channel 420 forms a trough underneath tabbed washer 230.

Once tabbed washer 230 is assembled to flange 212, the two elements may then be slid over shaft potion 233 of left hand gear hub 232. If thrust washer 228 is provided, thrust washer is slid over shaft portion 233 of left hand gear hub 232 so as to be positioned between tabbed washer 230 and side gear 240. Outer mating periphery 410 of flange 212 is mated to outer mating periphery 411 and secured together by suitable fasteners (not shown), such as, for example, bolts. When assembled, the flange 212 is thus rotatively fixed to the differential carrier 210. In one exemplary arrangement the fasteners are configured to extend through the plurality of apertures 254, and further configured to engage into a corresponding threaded aperture positioned on the differential carrier 210. The fasteners may be tightened to a predetermined torque. As also discussed above, the outer periphery mating surface 410 may include at least one alignment element 414 that is configured to engage a corresponding alignment element configured on the differential carrier 210. The alignment element 414 is illustrated in FIG. 4 as an aperture that is configured to receive an alignment pin that is either configured directly on the differential carrier 210 (not shown) or an alignment pin 252 that is inserted through the aperture 414 during assembly.

The slots 417 are configured on the mating surface of outer mating periphery 410 to provide a compressive fit for trapping the tabbed washer 230 when the flange 212 is fastened to the differential carrier 210, as discussed above. Due to reaction forces from the gear set 218, 220, 238, 240 positioned within the differential carrier 210, and the interaction between the tabs 248 and the slots 417, rotation of the washer 230 is prevented. The axial position of the tabs 248 within the slots 417 is maintained by the clamping of the flange 212 to the differential carrier 210, as best illustrated in FIG. 3.

As also described above, the flange 212 may also include the raised pilot ring 416 that is configured to be received within an opening of differential housing 212. For certain light-weight materials, the raised pilot ring 416 will expand due to the operational temperatures experienced by the differential assembly 150. This expansion will further enhance securement between the flange 212 and the differential carrier 214.

The oil groove 418 configured within central aperture 424 serves to provide a lubricant to the inner surface of central aperture 424, as well as to the shaft portion 233 of left hand gear hub 232. As discussed above, the oil groove 418 may be fluidly connected to the oil channel 420 configured on the flange 212 inner land surface 422 to provide the lubricant beneath the tabbed washer 230. The oil groove 418 and the oil channel 420 are configured to provide lubrication paths for both the gears 218, 220, 238, 240 and washers 230, 228, 214, 222, 224 surfaces. The oil channel 420 in the flange 212 also serves to direct the lubricant to the side gears 238, 240. Additionally, a corresponding lubricant system (not illustrated) may be configured in the differential carrier 210.

The left hand gear hub 232 is shown as a hollow tube configured with a splined section 310. The splined section 310 is configured to receive a corresponding splined section (not illustrated) configured on at least one of the shaft element 132 and the joint 142, depending on the application. The engagement with the spline section 310 rotatively fixes the differential assembly 150 with at least one of the shaft elements 132 and the joint 142 to transmit torque from the transmission 116 to the wheels 144.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A differential flange assembly, comprising:
   a flange member defined by an engagement face and having an aperture therethrough, wherein at least one slot is formed on the engagement face so as to extend radially outward from the aperture;
   a washer member having at least one tab extending from a peripheral edge of the washer member and at least one opening, wherein the tab is configured to be seated within the slot to mate the washer member to the engagement face of the flange member, wherein the interaction of the slot of the flange member and the tab of the washer member prevent rotation of the washer member with respect to the flange member; and
   an oil groove formed in an inner surface of the differential flange that defines the aperture, wherein the oil groove is in fluid communication with the slot.

2. The differential flange assembly of claim 1, wherein the flange member further comprises an inner land member positioned around aperture and an outer land member positioned around the inner land member, wherein first a portion of the slot is formed in the outer land member and a second portion of the slot is formed in the inner land member.

3. The differential flange assembly of claim 2, wherein an oil channel is disposed between the inner and outer land members.

4. The differential flange assembly of claim 1, wherein the oil groove is configured in a spiral shape.

5. The differential flange assembly of claim 1, further comprising a raised pilot ring formed on the engagement face about the aperture and radially outward from the slot.

6. A torque transferring differential device, comprising:
   a differential carrier formed of a first material;
   a pinion assembly positioned within the differential carrier;
   a differential flange formed of a second material, the second material being different than the first material; wherein the differential flange is defined by an engagement face and having an aperture therethrough configured to receive a drive member element therein, wherein at least one slot is formed on the engagement face of the differential flange so as to extend radially outward from the aperture; and
   a washer member having at least one tab extending from a peripheral edge of the washer member and at least one opening, wherein the tab is configured to be seated within the slot to mate the washer member to the engagement face of the flange member, wherein the interaction of the slot of the flange member and the tab of the washer member prevent rotation of the washer member with respect to the flange member;
   wherein the differential carrier is configured to be rotatively fixed to the differential flange with the washer member captured between the differential carrier and the differential flange; and
   wherein the flange member further comprises an inner land member positioned around the aperture and an outer land member positioned around the inner land member, wherein a first a portion of the slot is formed in the outer land member and a second portion of the slot is formed in the inner land member.

7. The torque transferring differential device of claim 6, wherein the second material is exposed to a heat treatment process that is different than a heat treatment process of the first material.

8. The differential flange assembly of claim 6, wherein an oil channel is disposed between the inner and outer land members.

9. The differential flange assembly of claim 8, further comprising an oil groove formed in an inner surface of the differential flange that defines the aperture, wherein the oil groove is in fluid communication with the slot.

10. A differential assembly, comprising:
a differential carrier defining a cavity therein;
an aluminum differential flange;
a first gear hub and a second gear hub; and
a pinion assembly that is configured to operatively engage with the first and second gear hubs;
wherein the differential flange is defined by an engagement face and having an aperture therethrough configured to receive the first gear hub partially therethrough, wherein a plurality of slots are formed on the engagement face of the differential flange so as to extend radially outward from the aperture; and
a washer member having a plurality of tabs extending from a peripheral edge of the washer member and an opening formed therethrough, wherein the tabs are configured to be seated within corresponding slots to mate the washer member to the engagement face of the flange member, wherein the interaction of the slots of the flange member and the tabs of the washer member prevent rotation of the washer member with respect to the flange member;
wherein the differential carrier is configured to be rotatively fixed to the differential flange with the first and second gear hubs, pinion assembly and washer member are captured between the differential carrier and the differential flange; and
wherein the flange member further comprises an inner land member positioned around the aperture and an outer land member positioned around the inner land member, with an oil channel disposed therebetween wherein a first portion of the slot is formed in the outer land member and a second portion of the slot is formed in the inner land member.

11. The differential assembly according to claim 10, wherein the pinion assembly further comprises a shaft, first and second pinion gears positioned at either end of the shaft and washers disposed on the washers.

12. The differential assembly of claim 10, further comprising a plurality of oil grooves formed in an inner surface of the differential flange that defines the aperture, wherein each oil groove is in fluid communication with the oil channel via each slot.

13. The differential assembly of claim 12, wherein the oil grooves are configured in a spiral shape.

14. The differential assembly of claim 10, further comprising a raised pilot ring formed on the engagement face about the aperture and radially outward from the slot, wherein the pilot ring is configured to be received within the cavity of the differential carrier.

* * * * *